March 7, 1933. M. W. PADEN ET AL 1,900,300
VALVE CONTROL APPARATUS FOR DRY PIPE SPRINKLER SYSTEMS
Filed May 22, 1930
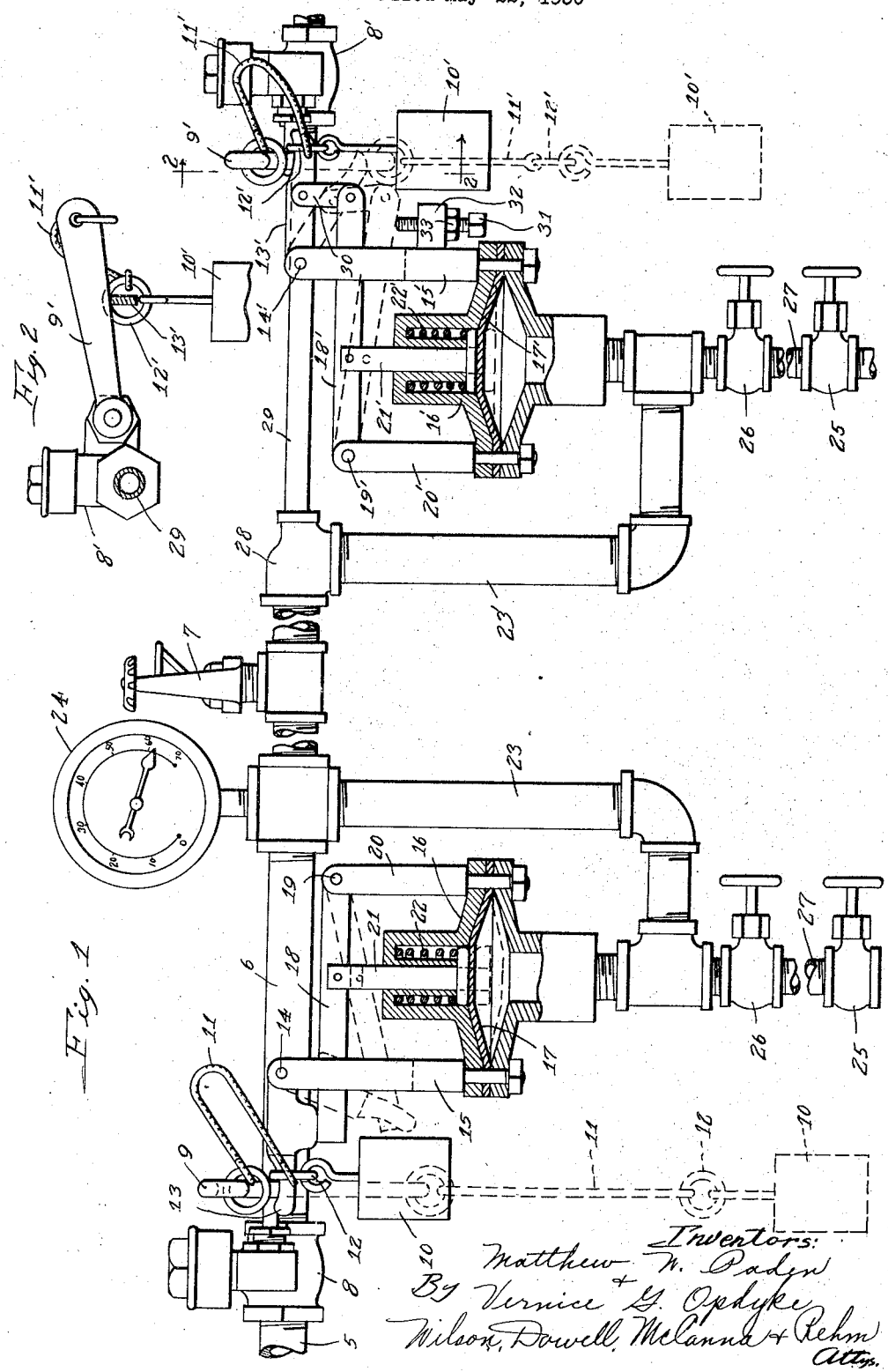

Patented Mar. 7, 1933

1,900,300

UNITED STATES PATENT OFFICE

MATTHEW W. PADEN AND VERNICE G. OPDYKE, OF ROCKFORD, ILLINOIS

VALVE CONTROL APPARATUS FOR DRY PIPE SPRINKLER SYSTEMS

Application filed May 22, 1930. Serial No. 454,545.

This invention relates to automatic sprinkler systems and has more particular reference to automatically operable water inlet and air exhaust valves for a dry pipe system.

At the present time, the water valves for dry pipe systems are extremely cumbersome, complicated and expensive affairs, operating on the principle of having air pressure hold back water pressure to keep the water valve closed. Aside from the almost prohibitive cost of these valves, which was all out of proportion to the cost of many systems, small ones in particular, there have been certain rather serious objections concerning the operation thereof. For one thing, leakage of the air could occur unnoticed and the valve would allow the system to become filled or partly filled without anyone being aware of that fact, and serious damage could result in cold weather, or in a cold storage plant installation, by the water filled pipes freezing and bursting, or at least throwing the system out of commission. Then, too, in certain types of water valves the small body of water used for sealing the valve was subject to slow vaporization and the vapors getting into the system, and condensing were subject to freezing in cold weather, or where a system was used in a cold storage plant, and the pipe was apt to be closed, thus closing off all or a part of the system, depending on where the freeze-up occurred. It is, therefore, the principal object of our invention to provide a water valve of simple, standard construction, such as an ordinary gate valve, operable by a drop weight normally held raised by a trip mechanism, the position of which is in turn controlled by a pressure responsive means subject to the air pressure in the system, thus avoiding the greater portion of the expense otherwise involved and at the same time avoiding complications arising out of the necessity of having water present for sealing the valve, and, furthermore, giving an easily visible indication when the water valve has opened to admit the water to the system.

It has also been quite a problem to quickly exhaust the air from the system when a sprinkler head opens, so as not to delay the arrival of the water at the head any longer than absolutely necessary and also to avoid the necessity for making all of the air escape at the opened head, which might have a tendency to accelerate the spread of the fire. Most air exhausters have been too cumbersome and expensive and some of them were not absolutely positive in action in the matter of closing as soon as all of the air was exhausted, so as to prevent loss of water and decreased pressure at the open sprinkler head. It is, therefore, another object of our invention to utilize for air exhausting a valve control apparatus of generally the same simple and economical construction provided for controlling the inlet of water, thus affording not only positive but quick action.

The invention is illustrated in the accompanying drawing, in which—

Figure 1 is a view of that portion of a dry pipe sprinkler system in connection with which the water inlet and air exhaust valve controls of our invention are utilized, and Fig. 2 is a sectional detail taken on the line 2—2 of Fig. 1.

In Fig. 1, the reference numeral 5 designates a water supply pipe extended from the usual main and arranged to deliver the water to the distributing pipes of the system or branch thereof, one of which pipes appears at 6. The distributing pipes are equipped with the usual sprinkler heads, one of which is shown at 7. As stated above, it has been customary to provide a water valve or so-called dry pipe valve between the water supply pipe and the system relying upon air pressure in the system to counteract the water pressure in the supply pipe to keep the valve closed. The objections thereto have been pointed out above; the moving parts were entirely enclosed in the body of the valve and there was no way of telling, except by a special test, whether the system was dry or not, and aside from the chance of water being admitted to the system by opening of the valve, certain valves involved the use of a water seal and that gave rise to the possibility for trouble due to condensation in the pipes of the system. According to our invention an ordinary gate valve 8, operable by oscillation of a lever 9, is provided between the water supply pipe and the system. In this way, there is the definite assurance that when the lever 9 is in its raised position, corresponding to the closed position of the valve, the water is excluded from the system. In other words, this is part of a clearly visible indication that the system is dry. Then, too, the elimination of a valve of very special construction, such as was involved where the air pressure in the system overbalanced the water pressure in the supply pipe, means quite a saving in cost. To take care of the operation of the lever 9 automatically immediately upon a drop in the air pressure in the system I provide a drop weight 10 connected by means of a rope or cable 11 to the outer end of the lever 9, the weight being sufficiently heavy and there being sufficient slack in the rope so that when the weight is dropped to the extent permitted by the rope, as indicated in dotted lines in Fig. 1, it has sufficient momentum to easily overcome any resistance to opening of the valve. A ring 12 is suitably interposed between the weight 10 and the end of the rope 11 and serves as a means whereby the weight may be held suspended in a raised or cocked position as, for example, on a trigger 13, as shown in full lines in Fig. 1. The trigger 13 is pivoted at 14 on a bracket 15 projecting upwardly from the casing 16 for a pressure responsive diaphragm 17. An arm 18, pivoted at one end, as at 19, on another bracket 20 carried by the casing 16, has its other end reaching through the forked upper end of the bracket 15 underneath the trigger 13 to hold the same in the cocked position shown in full lines. A plunger 21 is held raised by the diaphragm 17 against the action of a compression spring 22 in the casing 16 and has the upper end thereof forked for reception of the arm 18. A pipe 23 is connected with the system and to the lower end of the casing 16 to subject the diaphragm 17 to the air pressure of the system. A pressure gauge 24 is suitably provided to indicate the air pressure existing in the system.

In operation, assuming that the spring 22 exerts enough pressure to depress the plunger 21 when the air pressure in the system drops to 25 pounds or less, it will be seen that the system may be charged with air under a pressure of, let us say, 60 pounds per square inch, such as is indicated by the gauge 24, the trigger 13 being moved to cocked position prior to the charging of the system with air pressure and being thereafter held in the cocked position by the plunger 21. Then, if one or more of the sprinkler heads 7 is opened in the well known manner, it is evident that the air pressure in the system will drop immediately, and when the pressure drops to as low as 25 pounds per square inch, or thereabout, the spring 22 will depress the plunger 21 and release the trigger 13 to drop the weight 10 and operate the valve. It is, of course, possible to operate the sprinkler system without special means for quickly exhausting the air, as hereinafter described, and in such event as soon as the air between the supply pipe and the open sprinkler head or heads has escaped, water will be discharged to extinguish the fire in the usual way. However, it is preferred to provide an air exhauster so as not to delay the arrival of the water in the open sprinkler heads any longer than is absolutely necessary. If a leak should develop at any point in the system causing a gradual drop in the air pressure, it is evident that when the water valve is opened, as previously described, that fact is at once evident because of the position of the lever 9 and weight 10. The trouble is easily rectified by manually closing the valve by operation of the lever 9 and opening a drain valve 25 to allow the water to escape, whereupon the pressure in the system can be brought up again to normal in the usual way, as for example, through the valve 25 and the leaks in the system repaired. The weight 10, will, of course, be raised again and attached by means of the ring 12 to the trigger 13 so as to be in a position to take care of automatic opening of the water valve when the next occasion therefor arises. Another valve 26 is shown above the valve 25 with a sufficient length of pipe 27 therebetween to constitute a sediment or trap chamber for the collection of condensation or water leakage between the valves, which can be discharged without loss of air pressure by simply closing the valve 26 and opening the valve 25, and thereafter closing the valve 25 and reopening the valve 26 to replace the collecting chamber in communication with the system. In passing, it will, of course, be appreciated that while reference has been made specifically to a gate valve for use as the water valve any other suitable or preferred type of valve might be used, and while reference has been made specifically to a diaphragm 17, a piston type pressure responsive device or any other suitable or preferred pressure responsive device might be used without seriously affecting the operation of the invention.

At the remote end of the system or branch thereof the distributing pipes have communication with an air exhauster for the purpose of insuring speedier escape of the air and proportionately speedier arrival of the water at the open sprinkler heads. A reducing T 28 communicating with the pipe or pipes 6, as shown, has a small pipe 29 leading therefrom to a gate valve 8′ similar to the valve 8 previously described. The valve has an operating lever 9′ like the other valve also arranged to be operated by a drop weight 10′ that is connected with the lever through a rope or cable 11′. A ring 12′ serves to hold the weight 10′ suspended on a trigger 13′ pivoted at 14′ on a bracket 15′ on the casing 16′ of a diaphragm 17′. An arm 18′ pivoted at 19′ on another bracket 20′ on the casing 16′ is arranged to raise and lower the trigger 13′ through a link connection 30 provided between the free end of the arm 18′ and the trigger, as shown. The plunger 21′ is held raised by the diaphragm 17′ against the action of a compression spring 22′ in the casing 16′ whereby to hold the trigger 13′ in the cocked or raised position shown in full lines. The diaphragm 17′ is kept subject to the air pressure existing in the system by virtue of a pipe connection 23′. It is to be observed, however, that in this valve control the trigger 13′ is not free to drop like the trigger 13 of the other valve control owing to the fact that it has a link connection with the arm 18′ and the drop of the latter is limited by means of a stop screw 31 adjustably mounted in a lug 32 provided on the bracket 15′ and arranged to be held in adjusted position by a lock nut 33. This limited movement of the trigger is just enough to allow the ring 12′ to slip off the end thereof so that the weight 10′ will drop and operate the lever 9′ of the valve 8′ but not enough to permit the lever 9′ to move past the end of the trigger, the movement of the lever 9′ being limited by engagement with the trigger so that the valve 8′ will open only part way and, of course, the extent of the opening will be determined by the adjustment of the stop screw 31. The object in having this different arrangement will now be described.

In operation, the spring 22′ is preferably a trifle heavier than the spring 22 so as to actuate the trigger 13′ at a slightly higher pressure, let us say, for example, 30 pounds per square inch, as compared with the actuation of trigger 13 at 25 pounds pressure. In that way the air commences to exhaust shortly before the water is admitted to the system. The water enters the system as fast as it is allowed to do so by the escape of the air and there is no danger of a water hammer action, because the receding air acts as a cushion, as is thought to be evident. The fact that the air in the system is exhausted through the valve 8′ and is not forced to escape through the one or more open sprinkler heads is quite an advantage because there is much less delay in the arrival of the water at the heads for discharge on the fire, and less discharge of air on the fire such as might tend to accelerate the spread thereof. When all of the air has been exhausted, water under pressure entering the lower end of the casing 16′ raises the plunger 21′ against the action of the weak spring 22′, and the lever 9′ is accordingly raised by means of the trigger 13′ and the valve 8′ is closed to prevent loss of water and correspondingly decreased pressure at the open sprinkler heads. In this case, as in the other, it is obvious that we do not limit ourselves to the particular type of valve shown nor to the particular type of pressure responsive means.

The following claims have been drawn with a view to covering all legitimate modifications and adaptations of the invention such as will, no doubt, occur to others skilled in this art, especially after having the benefit of this disclosure.

We claim:

1. In a dry pipe sprinkler system, the combination with the water supply pipe containing water under pressure and the distribution pipe or pipes normally containing air under a predetermined pressure, of a valve connecting said pipes having a downwardly swingable operating member arranged to be raised manually or otherwise to closed position but arranged to be lowered abruptly to open position, a drop weight having direct connection with said member for operating the same, the said weight being arranged to be raised manually to operative position for subsequent operation of said member to open position, a trigger for holding the weight in raised position and preventing accidental movement of the valve operating member downwardly, said weight being releasably supported on said trigger, a diaphragm responsive to the air pressure existing in the distribution pipe, and a plunger movable with said diaphragm to directly release said trigger, said diaphragm being arranged upon a drop in said pressure past a predetermined point to move the plunger to release the trigger and cause the weight to drop and thereby operate the valve operating member to open said valve.

2. In a dry pipe sprinkler system, the combination with the water supply pipe containing water under pressure and the distribution pipe or pipes normally containing air under a predetermined pressure, of a valve connecting said pipes having a downwardly swingable operating member arranged to be raised manually or otherwise to closed position but arranged to be lowered abruptly to open position, a drop weight having direct connection with said member for operating the same, there being a flexible element of a certain length providing such connection, the said weight being arranged to be raised at the time said member is moved to closed position, whereby to provide a predetermined amount of slack in the flexible element and thus determine the extent of the free drop of the weight, there being a ring for suspending said weight, a pivoted trigger for keeping the weight in raised position arranged to have the ring slipped over the same and held against displacement by the valve operating member in its normal operating position, a diaphragm responsive to the air pressure existing in the distribution pipe, and a plunger movable with said diaphragm to directly release said trigger, said diaphragm being thereby arranged upon a drop in said pressure past a predetermined point to move the plunger to realse the trigger and cause the weight to drop and thereby operate the valve operating member to open said valve.

3. In a dry pipe sprinkler system, the combination with the water supply pipe containing water under pressure and the distribution pipe or pipes normally containing air under a predetermined pressure, of a valve, such as a gate valve, connecting the water supply pipe with the distribution pipe and having a downwardly swingable operating lever arranged to be raised to close the valve and lowered to open the same, said lever being arranged to be moved to closed position manually or otherwise and to be moved abruptly automatically to open position, a single drop weight for operating said lever, a flexible element of a certain length providing a direct operating connection between the weight and the lever, a ring for suspending said weight, a trigger member for supporting the weight releasably in a raised position predetermining the extent of possible free drop of the weight for opening the valve, the ring being arranged to be slipped over the trigger behind the valve operating lever so that the lever in its normal position prevents accidental dropping of the weight, a trigger operating member arranged to hold the same in cocked position until the time for release of the weight, a pressure chamber having communication with the distribution pipe so as to be subject to the air pressure existing therein, and a plunger responsive to the pressure in said chamber for operating the last mentioned member, said plunger tending to move in one direction from operative to inoperative position to release the weight but arranged to be held in operative position until the pressure in the distrubution pipe drops to a predetermined point.

4. In a dry pipe sprinkler system, the combination with a distribution pipe or pipes normally containing air under a predetermined pressure, of an air exhauster valve connected therewith and arranged to discharge air therefrom to the atmosphere, said valve having the operating member thereof arranged to be moved to closed position and arranged to be moved abruptly to open position, means associated with the valve operating member arranged to have sufficient potential energy stored therein for operating the valve operating member, means for releasably holding the first mentioned means inoperative but arranged when actuated to release the same for operation, and means responsive to the air pressure in the distribution pipe arranged upon a drop in said pressure beyond a predetermined point to operate the second mentioned means so as to release the first mentioned means whereby automatically to open said valve, said last mentioned means being operative under the hydraulic pressure of the water filling the pipes upon the exhausting of the air therefrom to operate the valve against the action of the first mentioned means to closed position.

5. In a dry pipe sprinkler system, the combination with a distribution pipe or pipes normally containing air under a predetermined pressure, of an air exhauster valve connected therewith and arranged to discharge air therefrom to the atmosphere, said valve having the operating member thereof arranged to be moved to closed position and arranged to be moved abruptly to open position, a drop weight having connection with said member for operating the same, the said weight being arranged to be raised at the time said member is moved to closed position, means for keeping the weight in raised position, and means responsive to the air pressure existing in the distribution pipe and arranged upon a drop in said pressure past a predetermined point to operate the last mentioned means whereby to cause the weight to drop and thereby operate the valve operating member to open said valve, the last mentioned means being operable under the hydraulic pressure of the water filling the pipe upon the exhausting of the air therefrom whereby to operate the valve against the action of the weight to closed position.

6. In a dry pipe sprinkler system, the combination with a distribution pipe or pipes normally containing air under a predetermined pressure, of an air exhauster valve connected therewith and arranged to discharge air therefrom to the atmosphere, said valve having the operating member thereof arranged to be moved to closed position and arranged to be moved abruptly to open position, a drop weight having connection with said member for operating the same, there being a flexible element of a certain length providing such connection, the said weight being arranged to be raised at the time said member is initially moved to closed position, whereby to provide a predetermined amount of slack in the flexible element and thus determine the extent of the free drop of the weight, means for keeping the weight in raised position, and means responsive to the air pressure existing in the distribution pipe and arranged upon a drop in said pressure past a predetermined point to operate the last mentioned means whereby to cause the weight to drop and thereby operate the valve operating member to open said valve, the last mentioned means being operative under the hydraulic pressure of the water filling the pipes upon the exhausting of the air therefrom whereby to operate the valve operating member against the resistance of the weight to close the valve a second time.

7. In a dry pipe sprinkler system, the combination with a distribution pipe or pipes normally containing air under a predetermined pressure, of an air exhauster valve, such as a gate valve, connected therewith and arranged to discharge air therefrom to the atmosphere, said valve having an operating lever arranged to be raised to close the valve and lowered to open the same, said lever being arranged to be moved to closed position and to be moved abruptly to open position, a drop weight for operating said lever, a flexible element of a certain length providing a connection between the weight and the lever, a pivoted releasable support for the weight for holding the same in a raised position predetermining the possible free drop of said weight for operating the lever, means for releasably holding said support in operative position, pressure responsive means subject to the air pressure in the distribution pipe arranged when the pressure drops to a predetermined point to operate the last mentioned means whereby to cause the dropping of the weight to open the valve and means for limiting the movement of said support to such an extent that the weight is released for dropping but movement of the valve operating lever is limited by said support, the pressure responsive means being arranged to be subjected to the hydraulic pressure of the water filling the pipes upon the exhausting of the air therefrom whereby to operate said support in the opposite direction to operate the valve operating lever against the action of the weight to close the valve.

8. In a dry pipe sprinkler system, the combination with a distribution pipe or pipes normally containing air under a predetermined pressure, of an air exhauster valve, such as a gate valve, connected therewith and arranged to discharge air therefrom to the atmosphere, said valve having an operating lever arranged to be raised to close the valve and lowered to open the same, said lever being arranged to be moved to closed position and to be moved abruptly to open position, a weight for operating said lever, a pivoted support for releasably holding the weight in a raised position preparatory to operation of the lever, means for releasably holding said support with the weight raised, pressure responsive means subject to the air pressure in the distribution pipe arranged when the pressure drops to a predetermined point to operate the last mentioned means whereby to cause the dropping of the weight to open the valve and means for limiting the movement of said support whereby movement of the valve operating lever is limited, the pressure responsive means being arranged to be subjected to the hydraulic pressure of the water filling the pipes upon the exhausting of the air therefrom whereby to operate said support in the opposite direction to raise the valve operating lever against the action of the weight to close the valve.

9. In a dry pipe sprinkler system, the combination with a distribution pipe or pipes normally containing air under a predetermined pressure, of an air exhauster valve connected therewith and arranged to discharge air therefrom to the atmosphere, said valve having the operating member thereof arranged to be moved to closed position and arranged to be moved abruptly to open position, a drop weight having connection with said member for operating the same, the said weight being arranged to be raised at the time said member is moved to closed position, means for keeping the weight in raised position, means responsive to the air pressure existing in the distribution pipe and arranged upon a drop in said pressure past a predetermined point to operate the last mentioned means whereby to cause the weight to drop and thereby operate the valve operating member to open said valve, and means for limiting the movement of the valve operating member so as to allow the valve to open only part way, the means responsive to the air pressure being operable under the hydraulic pressure of the water filling the pipe upon the exhausting of the air therefrom whereby to operate the valve against the action of the weight to closed position.

In witness whereof we have hereunto affixed our signatures.

MATTHEW W. PADEN.
VERNICE G. OPDYKE.